United States Patent

[11] 3,603,150

| [72] | Inventors | Stephen L. Kurtin<br>536 S. Euclid Ave., Pasadena, Calif. 91106;<br>Carver A. Mead, 2036 Pasadena Glen<br>Road, Pasadena, Calif. 91107 |
|---|---|---|
| [21] | Appl. No. | 878,001 |
| [22] | Filed | Nov. 19, 1969 |
| [45] | Patented | Sept. 7, 1971 |

[54] DISPOSABLE BODY TEMPERATURE SENSOR
7 Claims, 20 Drawing Figs.

[52] U.S. Cl. ................................................. 73/362 SC,
73/362 R, 338/22 SD, 338/28
[51] Int. Cl. ................................................. G01k 7/22
[50] Field of Search .......................................... 73/362 R,
362 SC; 338/22, 22 SD, 25, 28

[56] References Cited
UNITED STATES PATENTS
| 3,187,576 | 6/1965 | Beeston | 73/362 AR |
|---|---|---|---|
| 3,270,309 | 8/1965 | Vanik et al. | 338/22 SD |
| 3,379,063 | 4/1968 | Schonberger | 73/362 AR |
| 3,412,610 | 11/1968 | Prussin | 73/362 AR |
| 3,441,846 | 4/1969 | Petrohilos | 73/362 X |

*Primary Examiner*—Louis R. Prince
*Assistant Examiner*—Frederick Shoon
*Attorney*—Spensley, Horn and Lubitz

ABSTRACT: A medically accurate disposable body temperature sensor employing a bar of high-purity crystalline germanium. The germanium bar is disposed within a plastic rod and ambipolar electrical contacts are made to opposed ends of the bar. Ambipolar contacts in conjunction with high-purity germanium assure accurate, reproducible thermometry. A digital readout into which the thermometer is to be selectively connected including a circuit for insuring a linearized reading over the temperature range of interest is also provided.

PATENTED SEP 7 1971 3,603,150
SHEET 1 OF 4
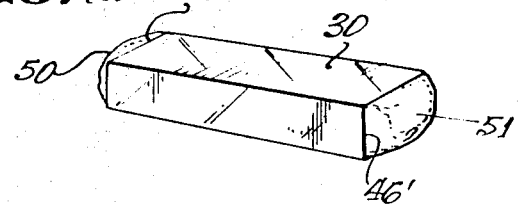
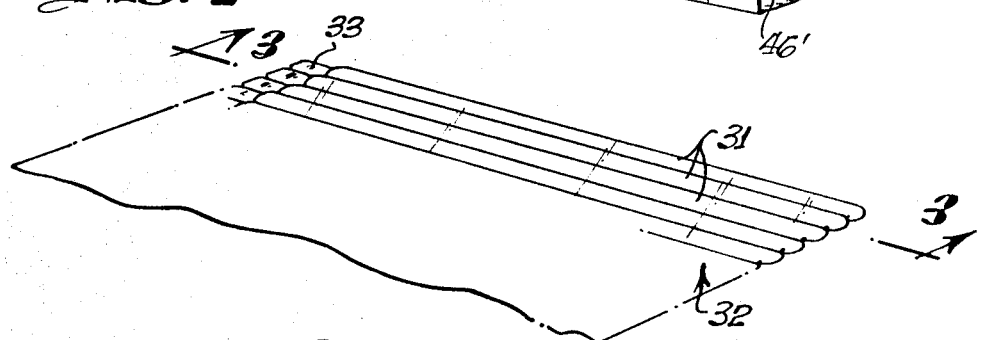
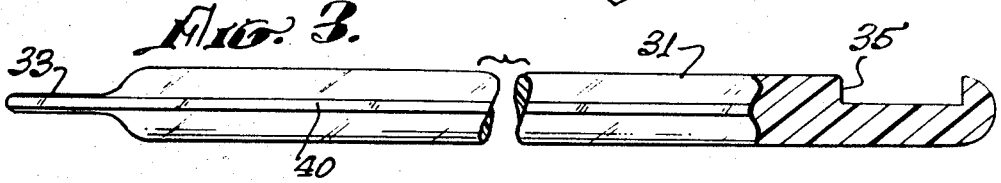
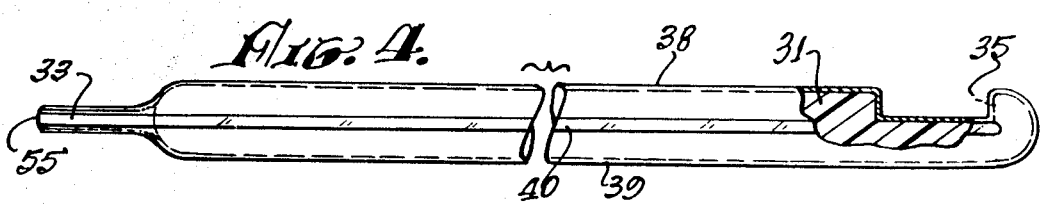
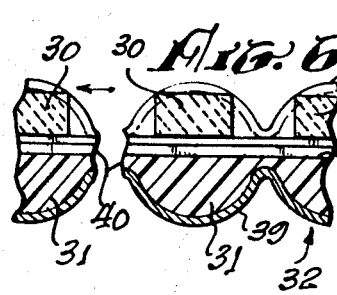
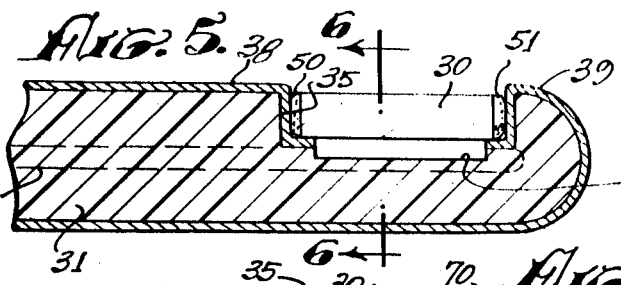
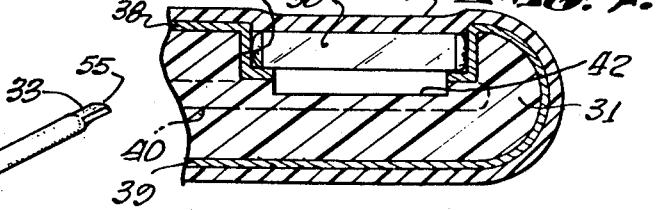
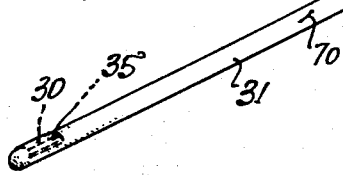
INVENTORS
STEPHEN L. KURTIN,
CARVER A. MEAD,
By THEIR ATTORNEYS
Spensley & Horn.

INVENTORS.
STEPHEN L. KURTIN,
CARVER A. MEAD,
BY THEIR ATTORNEYS
Spensley & Horn INVENTORS.
STEPHEN L. KURTIN.
CARVER A. MEAD,
BY THEIR ATTORNEYS
Spensley & Horn.

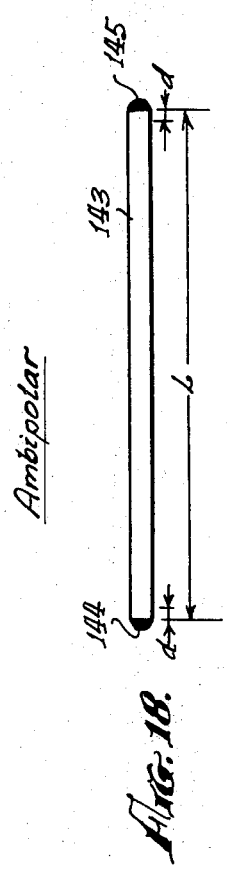
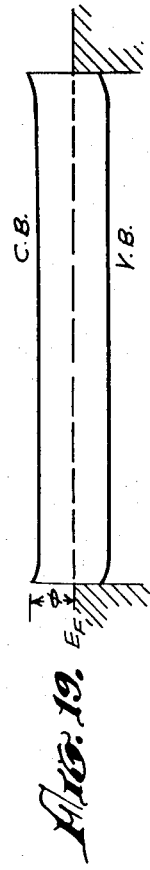
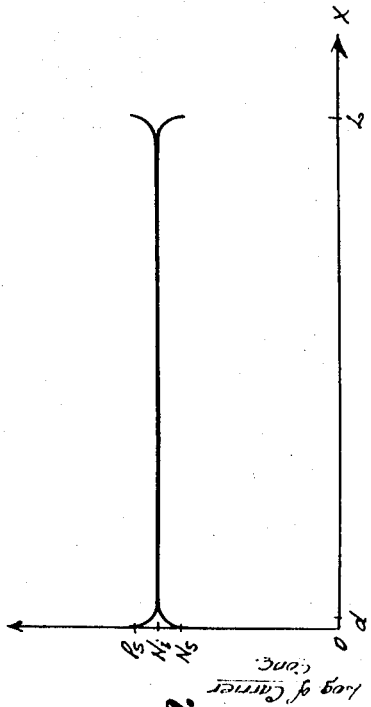
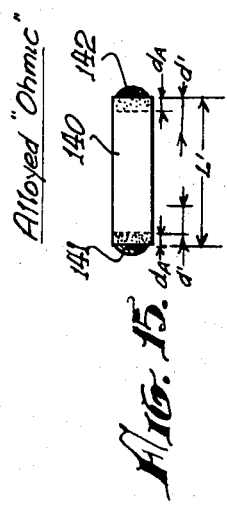
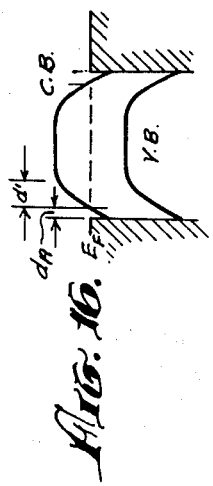
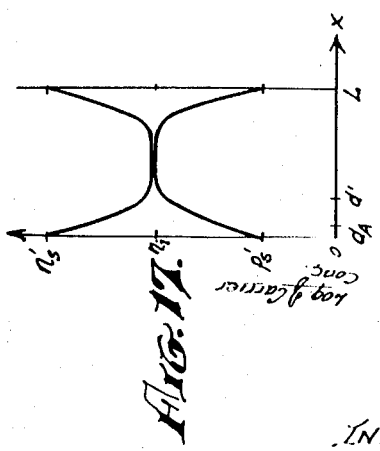

DISPOSABLE BODY TEMPERATURE SENSOR

BACKGROUND OF THE INVENTION

1. Field of the Invention

The present invention relates to a disposable body temperature sensor and, more particularly, to one which is used in conjunction with a novel electronic readout device. This temperature sensor is accurate to clinical medical standards, over the human body temperature range.

2. Description of the Prior Art

Disposable medical thermometers supposedly having clinical accuracy have not heretofore been commercially practicable.

For purposes of this invention, clinical accuracy is defined by Commercial Standard CS–1–52, "A recorded voluntary standard of the trade published by the U.S. Department of Commerce." This standard developed by representatives of the American Hospital Association, the National Bureau of Standards, and the Technical Committee on Thermometers of the Federal Specifications Board requires the following accuracies:

±0.2° F. at 98° F.
±0.2° F. at 102° F.
±0.3° F. at 106° F.

Prior art medical thermometers utilized for sensing the temperature of a human being for diagnostic or monitoring purposes have generally taken the form of a liquid, such as mercury, located in a capillary tube having a bulb at one end. While these thermometers have been extensively utilized for many years, they are beset by certain problems and limitations relating to accuracy, cost, sanitation, readability, and convenience of use. It is well known and documented that personnel using capillary-type thermometers frequently make serious errors which occasionally result in completely inaccurate diagnosis. These errors arise from several sources:

Capillary tube thermometers are difficult to read having a small, crowded scale and a mercury column which may be discerned only with much effort.

Despite voluntary industry standards as embodied in Commercial Standard CS–1–52, documented studies reveal that a significant fraction of the capillary thermometers on the market deviate widely from the specified accuracy tolerance. This deviation is a direct result of the precision required, and the inherent limitations of capillary thermometer construction.

The mercury containing bulb of a capillary thermometer has a high heat capacity. As a result intimate thermal contact for long periods of time (at least 3 minutes) is required for an accurate indication of body temperature. False indications arise from insufficient duration of insertion, or intermittent thermal contact, as is often the case for oral temperature measurements.

Consider the sanitation and cost problems. In hospitals and other similar institutions a thermometer is generally utilized for many patients, thereby transferring viruses and bacteria from individual to individual with concomitant deleterious consequences. Because capillary thermometers cannot be autoclaved without destruction, the sanitation problem is ever present and is not completely obviated by insertion of the thermometer into a sterilizing liquid, such as alcohol. The cost of a single capillary thermometer is on the order of a dollar so that the expense of the large quantity of thermometers required to stock a hospital or other similar facility can be rather extensive, particularly when breakage is considered. If a new thermometer is provided for each patient and the thermometer is disposed of after each use or after the patient is discharged, as is desired for sanitation purposes, thermometer expense is multiplied appreciably and can reach substantial sums.

To obviate the problems attendant with the use of capillary medical thermometers, other means of thermometry are required. Conventional nonmedical temperature-measuring techniques such as the use of thermocouples or platinum resistance thermometry do not meet the special requirements of medical thermometry. These special requirements include a low-cost, fast response, disposable sensor of assured and reproducible accuracy.

Thermocouples do not measure absolute temperature. Instead, the voltage generated by a thermocouple is related to the temperature difference between a pair of junctions between dissimilar metals, whereby the use of such devices requires a stable temperature reference. However, a temperature reference stable to clinical accuracy can be attained only with great difficulty through the use of relatively expensive and bulky equipment, and thence is not feasible for the usual medical thermometer situation.

Resistance thermometers employing metals are not feasible for routine medical use for numerous reasons. All metals, including platinum, have low resistivity and low temperature coefficient of resistivity; therefore, they are relatively insensitive to temperature changes and present severe fabrication problems with accompanying high costs of measuring equipment and manufacture. For example, platinum, the most advantageous metal from a reproducibility standpoint, has a resistivity of $10^{15}$-ohm centimeters and a temperature coefficient of resistivity of 0.003 per degree centigrade in the body temperature range.

Because metals have such extremely low resistivity, temperature sensors formed thereof must be fabricated from relatively lengthy strands of wire since a resistance of at least 100 ohms is required to enable relatively conventional, inexpensive and uncomplex techniques to be utilized for measurement purposes. A platinum wire must have a length of several feet to provide an end-to-end resistance on the order of 100 ohms. The relatively low temperature coefficient of metals is reflected in the geometrical tolerances which must be maintained in manufacturing a wire sensor since the resistance of a material is determined by its geometrical length and cross section, as well as resistivity. To maintain the response of a resistance-type temperature sensory material utilized for medical purposes within established standards, the geometrical dimensions of the sensor must be controlled to predetermined tolerances. If the dimensions of the sensor cannot be controlled to the predetermined tolerances, expensive individual calibration of each sensor must be provided. The low temperature coefficient of resistivity of platinum requires each platinum wire strand utilized for a resistance-type temperature sensor to be manufactured to a geometrical tolerance of ±0.04 percent if the medically accepted accuracy standard is to be maintained over the body temperature range of 96° F. to 106° F. It has been generally found impossible to maintain platinum wire strands to length and diameter tolerances of within ±0.04 percent thereby necessitating the calibration of each platinum thermometer on an individual basis. Individual calibration of wire resistance thermometers increases the cost thereof extensively, to a figure on the order of tens of dollars.

In accordance with the present invention, the problems of temperature measurement relative to medical thermometers, outlined supra, are obviated by employing a bar of high-purity crystalline germanium with ambipolar contacts at or near the opposed ends thereof as the sensor element. The sensor element is housed within a plastic rod near one end thereof. Medical thermometers employing a germanium sensor element can be manufactured for on the order of a few cents, a price sufficiently low to enable their disposal after each use. Crystalline germanium is sufficiently low in cost, and has a large enough bulk resistivity and temperature coefficient of resistivity, to enable a relatively small mass thereof to be employed as a temperature-sensitive element in a medical thermometer. High-purity crystalline germanium costs of the order of $200/kilogram, requiring an expenditure of only approximately one-third of a cent per sensor element (i.e., per each disposable thermometer).

A typical sensor unit of crystalline germanium in accordance with the presently preferred embodiment of this invention may comprise a rectangular bar having a length of one-half centimeter, with equal length sides 0.05 centimeter each. Such a sensor from end to end has a resistance on the order of several thousand ohms at body temperature. In contrast, a platinum bar having the same shape and dimensions has a resistance on the order of 0.002 ohm. Hence, the resistance of a very small and easily fabricated body of crystalline germanium is more than 1 million times greater than that of a platinum sensor having the same dimensions. Thus, the resistance of a germanium bar can be easily monitored utilizing conventional techniques, in contrast to the elaborate equipment which would be required for measuring the resistance of a platinum bar of identical shape.

An even more significant fact pertaining to the use of germanium rather than a metal, such as platinum, as a temperature-sensing resistance material is the large temperature coefficient of resistivity possessed by high-purity germanium. The temperature coefficient of resistivity of germanium of the hereinafter specified type and resistivity, at body temperature, is approximately 15 times greater than the temperature coefficient of platinum. Because of this factor, the geometrical tolerance with which a body of germanium must be manufactured to achieve the reproducibility required for temperature measurements to medical standards is 15 times less than that for platinum. The reduction in manufacturing tolerance by a factor of 15 enables interchangeable germanium sensor elements to be mass-produced reproducibly with relatively standard present art techniques. Hence, the cost of fabricating a sensor from germanium is much less than that for platinum, even without considering the relative cost of materials.

A prior art temperature-sensing device employing a germanium crystal body as a temperature sensing element is shown in U.S. Pat. No. 3,270,309, entitled "Temperature Sensitive Device" by M. C. Vanik, et al., issued Aug. 30, 1966. While this patent does not concern itself with a disposable or other body temperature-measuring device, it does teach the use of a thermometer made of single crystal germanium for measurement of temperatures from 300° K. to 600° K. It is not at all concerned with and does not teach or suggest how such a device may be employed to produce a sensor element of medical accuracy over the range of body temperatures, i.e., in the vicinity of 310° K., namely from 96° F. to 106° F.

Vanik, et al. is intended to be used in microwave power-measuring equipment, gas phase chromatagraphs, vacuum gauges and the like, a wholly different environment than that for which the present invention is designed. In fact, the Vanik, et al., patent teaches that single crystal germanium of a resistivity in the range from 1 to 70 ohms centimeter at 25° C. may be used. The sensor element to be useful for the present invention must be quite differently selected. It has been found by the inventors of the present invention that a critical range of resistivity for crystalline (not necessarily single crystal) germanium must be selected as will hereinafter be explained. In addition, "ohmic" contacts fabricated as described in Vanik et al. will not permit the fabrication of interchangeably accurate sensors for medical thermometry.

SUMMARY OF THE INVENTION

The present invention device is a disposable, inexpensive highly accurate medical temperature sensor and associated electronic digital readout unit into which the sensor is selectively connected.

The temperature-measuring device is an elongated bar of crystalline germanium, preferably of the order of 0.5 centimeter in length. Ambipolar contacts are made at or near opposite ends of the bar. In the vicinity of such contacts carrier lifetime is substantially shorter than in the bulk of the bar. The germanium comprising the bar must be of high-purity material as will hereinafter be explained. The bar is disposed in a cavity near one end of a plastic rod. Two metallic strips are provided over the length of the surface of the plastic rod. Each strip makes electrical connection with a connector located on one end of the plastic rod and to one of the contacts located on opposite ends of the germanium bar. The connector in turn serves to couple the sensing element to the novel electronic digital readout device of the present invention.

The present invention thus provides a highly accurate and inexpensive temperature sensor or thermometer which is designed to be disposably connected to an electronic digital readout device. Further, the present invention defines criteria for fabricating the germanium temperature-sensing element which achieves the desired results with a repeatedly high yield.

Accordingly, it is an object of the present invention to provide a new and improved medical thermometer.

Another object of the invention is to provide a new and improved medical thermometer that is so inexpensive as to be disposable after each use.

Another object of the invention is to provide a new and improved medical thermometer that is more easily and reliably read than the prior art thermometers.

Another object of the invention is to provide a new and improved medical thermometer that is extremely easy to use, may be read in situ, and requires substantially less time to reach thermal equilibrium in body cavities than do prior art thermometers.

Another object of the invention is to provide a new and improved medical thermometer that is readily manufacturable to medical accuracy.

Another object of the invention is to provide a new and improved medical thermometer that is capable of being directly interfaced with electronic patient-monitoring equipment.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawings are for the purpose of illustration and description only, and is not intended as a definition of the limits of the invention.

BRIEF DESCRIPTION OF THE DRAWINGS

FIG. 1 is a greatly enlarged perspective view of a bar of crystalline germanium which is the preferred sensor element in accordance with the present invention;

FIG. 2 is a partial perspective view showing an assembly of plastic rods during an interim stage of production to produce disposable thermometers in accordance with the presently preferred embodiment of this invention;

FIG. 3 is a view taken along lines 3—3 of FIG. 2;

FIG. 4 is a view similar to FIG. 3 showing two separated metallized coating strips to act as conductors on the surface of the plastic rods of FIG. 3;

FIG. 5 is an expanded view, partly in section, of one end of the plastic rod of FIG. 4 showing how it appears in a subsequent step in the manufacture of the present invention thermometer;

FIG. 6 is a view taken along lines 6—6 of FIG. 5;

FIG. 7 is a view similar to FIG. 5 showing how the sensor end of the present invention thermometer appears in cross section upon completion;

FIG. 8 is a perspective view of the completed disposable thermometer made in accordance with the presently preferred embodiment of the invention;

FIG. 15 is an enlarged schematic view showing a high-purity crystalline germanium bar which ohmic contacts have been made at opposed ends.

FIG. 16 is a schematic energy barrier diagram showing the energy barrier between an interface of germanium and metal for the bar of FIG. 15;

FIG. 17 is a graph showing carrier density as a function of position along the bar of FIG. 15;

FIG. 18 is a view similar to FIG. 17 wherein the contacts are ambipolar instead of ohmic;

FIG. 19 is a schematic energy band diagram showing the energy barrier between an interface of germanium and metal for the bar of FIG. 18; and FIG. 20 is a graph showing carrier density as a function of position along the bar of FIG. 18.

DESCRIPTION OF THE PREFERRED EMBODIMENT

Figure 9:
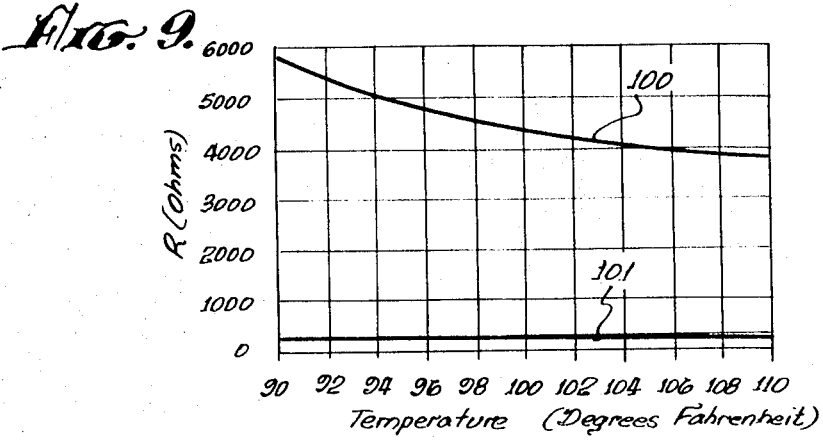
FIG. 9 is a graph showing resistance in ohms as a function of temperature in degrees fahrenheit over the body temperature range which illustrates for comparative purposes the response to temperature of crystalline germanium and platinum.
Figure 12:
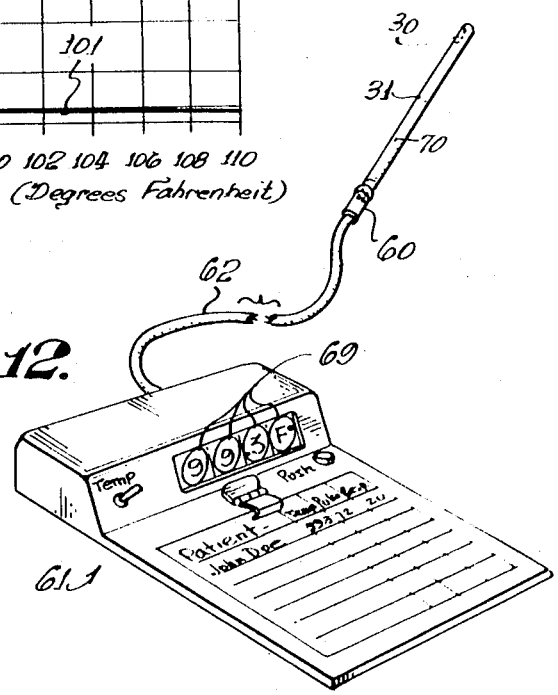
FIG. 12 is a perspective view showing how the thermometer of the present invention may be selectively connected to a digital readout device for presentation of the body temperature being measured by the disposable thermometer.

Referring now to the drawings, and more particularly to FIG. 1, there is shown a perspective view, greatly enlarged, of a crystalline bar of germanium 30, which assumes a generally parallelepiped shape. Bar 30 is the sensing element in accordance with the presently preferred embodiment of the invention. The germanium material must be crystalline in form, but not necessarily single crystal; polycrystalline material is also satisfactory. In length the bar 30 is of the order of 0.500 centimeter and of substantially square cross section 0.050 centimeter on a side. The germanium must be selected so that if N type it has a net donor concentration of $8 \times 10^{12}/cm^3$ or less and if P type it has a net acceptor concentration of $5 \times 10^{13}/cm^3$ or less. The selection of these critical parameters for the sensor bar material will hereinafter be explained. Suffice it to say at this point that the inventors have discovered that the critical parameters for the sensors are that they must be:

1. of germanium;
2. of crystalline as opposed to noncrystalline material;
3. bar shaped;
4. of high purity, i.e., of impurity concentration within the above-stated closely specified range.

The bar need not necessarily assume the shape of a parallelepiped, but it must have a large length to cross-sectional area ratio regardless of whether its cross section is square, rectangular, elliptical, round, etc. Additionally, the cross section need not be uniform over the length of the bar. A square cross-sectional configuration has been selected for simplicity of discussion.

The sensing element must be of a barlike configuration to minimize the effects of contacts on the measurement of sensor resistance, and hence to allow accurate measurement of the resistance of the bulk of the high-purity germanium bar. It is this latter resistance which corresponds directly to the sensor temperature. That is, the effect of the contacts, from a resistance point of view, compared to the bulk, should be sufficiently small that the measured resistance is that of the bulk ±0.4 percent. The magnitude of this criterion is determined from the slope of the resistivity versus temperature curve of high-purity germanium in the body temperature range and the accuracy requirements of Commercial Standard CS–1–52 (see FIG. 10, curve 82).

Another reason for requiring the sensor element to assume a barlike shape is the requirement that it have a sufficiently high resistance so as to be easily measured, and preferably of the order of from 2,000 to 5,000 ohms.

One of the primary reasons for choosing germanium for the sensor material is, as has previously been stated, that the material must have a large enough temperature coefficient of resistance to be reproducibly fabricated into a convenient size and shape with desired accuracy. There are in effect conflicting requirements: A disposable sensor for medical thermometry requires an inherently reproducible material which can be fabricated into interchangeable (i.e., accurate to clinical standards without the necessity of recalibrating the readout) sensors. Fabrication tolerances are relaxed in direct proportion to the temperature coefficient of resistivity of the material chosen. However, the larger the temperature coefficient the harder it becomes to purify the material sufficiently that it will be inherently reproducible. The inventors have found that high-purity crystalline germanium satisfies these conflicting requirements when properly employed. Germanium can be routinely purchased at sufficient purity to be inherently reproducible (these purity specifications are discussed in detail below) and the temperature coefficient of resistivity of such high-purity germanium is sufficiently large to allow its fabrication into interchangeable sensors (if, as discussed previously, appropriate contacts and sensor geometry are employed).

The reason that germanium of a crystalline structure must be used is that otherwise sufficient reproducibility could not be achieved. Single crystal material is of course ideal, but not necessary. Since the sensor bar is small in size, even if made of polycrystal material, there will statistically be a very few grain boundaries within a given sensor, thus, not substantially affecting the temperature-resistance relation of the sensor.

The construction of the present invention disposable medically accurate thermometer will now be explained with reference to FIGS. 2 to 8 and 12.

In FIG. 2 there is shown, in perspective, a plurality of thin plastic rods 31 in the assembly 32; each rod assumes a generally round cross section. The rods at this intermediate stage of production are shown joined together along the length dimension thereof so that a plurality (from 20–100 or more) of them may be hatch processed as will hereinafter be explained. Note that one end 33 of the rods 31 assumes a generally thin flat shape. Near the opposite ends of the rod 31, a generally rectangular slot 35 is located. The slot 35 is of a size and shape as to subsequently accommodate a germanium bar 30 therein.

In order to provide a conductive path to each end of the bar 30 upon its insertion (preferably by press fitting the same therein) subsequently into the slot 35, the entire assembly 32 is placed into a metal plating bath which deposits a metallic coating over the entire surface thereof. Two separate conducting regions 38 and 39 are defined when adjacent rods are separated to form individual sensors. These conducting regions are separated by two noncoated regions 40 on opposite sides of the rods along the length thereof. The two outermost rods will not have their outer sides masked by an adjoining rod along region 40, but the outer noncoated regions 40 on these two rods may subsequently be defined by abrading or otherwise. Thus, the rods in the assembly 32 will now appear as shown in FIG. 4.

Following the metallization step, a milling operation is carried out within slot 35 to remove the metal layer 38 in the vicinity of the lower surface of slot 35 to thus define a new unmetallized surface 42 of slot 35.

One germanium bar 30 having preaffixed, ultrasonically bonded dots 50 and 51 of In-Ag solder (alternatively pure In or other indium alloy solders may be used) is now placed into each slot as shown in FIG. 5.

The array is now broken into individual sensors and each sensor 31 is trimmed to nominal resistance at one fixed temperature; the sensor is then dip coated in plastic to protect the sensor element 30 and the plated conductors 38 and 39, but leaving the plated conductors exposed in the connector region 33. Thereafter a connector 60 (see FIG. 12) may be used to mechanically and electrically join the sensor 31 to an electronic digital readout device 61 through cable 62.

In FIG. 7 there is shown a partial schematic view of the plastic-coated sensor 31 with the germanium bar 30 in situ, all covered by a plastic film 70 and in FIG. 8 there is shown a perspective view of the thus-completed disposable sensor.

Having thus described the present invention sensor structure in its presently preferred embodiment, there will now be explained the manner of its operation.

Figures 10, 13, 14:
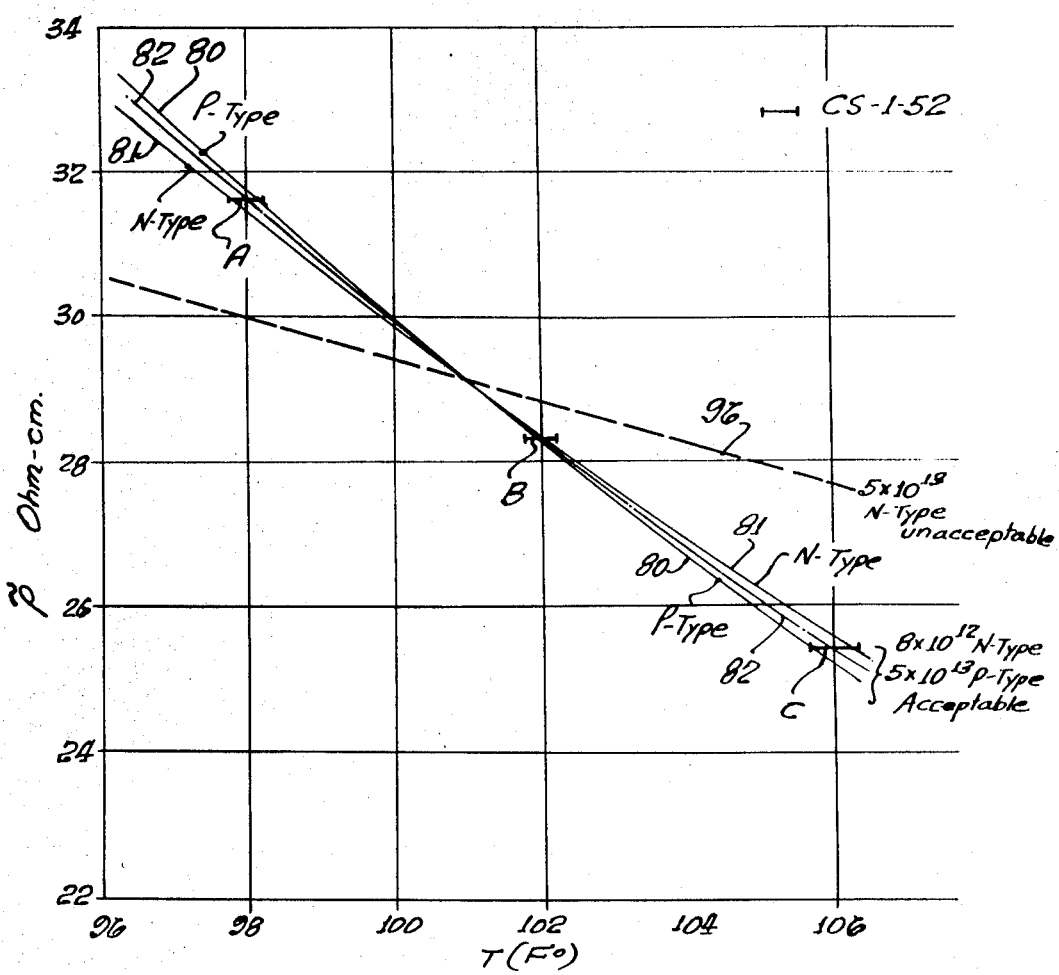
FIG. 10 is a graph showing the "normalized" resistivity in ohm-centimeters as a function of temperature in degrees fahrenheit for crystalline germanium of varying conductivity type and resistivity.
FIGS. 13 and 14 are schematic circuit diagrams showing two alternate configurations for power supply and associated circuitry to produce a digital readout representative of the magnitude of the temperature measured by the present invention thermometer.

Reference is now made to FIG. 10 wherein there is shown a family of curves indicating the acceptable normalized resistivity, $\tilde{\rho}_t$, of three different acceptable purity levels of crystalline germanium and one purity level which is not acceptable. The three horizontal lines labeled A, B and C drawn on the curve 82 are representations of the the accuracy requirement for medical thermometry as prescribed by the Commercial Standard CS-1-52 previously mentioned hereinabove. Thus, horizontal line A at its center point is at 98° F. and its right- and left-hand extensions, therefore, represent the permissible excursion of +0.2° F. and −0.2° F., respectively, as is set forth by the Standard. Likewise, horizontal line B has its center point at 102° F. and its right-hand and left-hand extensions, therefore, represent the permissible excursion of +0.2° F. and −0.2° F., respectively. Similarly, line C has its center point at 106° F. and its right-hand and left-hand excursion of +0.3° F. and −0.3° F., respectively.

Normalized resistivity (which corresponds, within a constant factor, to the measured resistance of sensors which are trimmed in manufacture to nominal resistance at one fixed temperature) may be explained as follows. Curve 82 represents the actual resistivity versus temperature relation for extremely pure germanium ($N_A \approx N_D < 10^{10}$/cm.³ where $N_A \equiv$ concentration of acceptor impurities, $N_D \equiv$ concentration of donor impurities). It is about this curve 82 that the lines A, B and C have been drawn. Curves 80 and 81 represent the normalized resistivity for specific specimens of P-type and N-type germanium respectively. If the absolute resistivity curves for these two materials through the temperature range of interest—96° F. to 108° F. were to be drawn on the graph of FIG. 10, neither curve would intersect curve 82. The curves 80 and 81 are obtained by vertically shifting these absolute resistivity curves so that they pass through the 101° F. point on the resistivity versus temperature curve 82. Hence $\tilde{\rho}_t$, as defined here, is useful in determining purity limits for germanium to be used for sensor fabrication. Curves 80 and 81 are drawn for the least pure acceptable material of each type. These curves are seen to just pass through the outer limits of lines A and C. Material of unacceptable impurity concentration will have a normalized resistivity curve which does not pass through the lines A, B and C. A typical normalized resistively curve for unacceptably impure germanium is illustrated by curve 96. Specifically, curve 80 corresponds to P-type germanium having net acceptor concentration of 5×10¹³/cm.³; curve 82 corresponds to N-type germanium having a net donor concentration of 5×10¹³/cm.³. From the curves 80, 82 and 96 we see that material whose purity deviates from the specified purity limits is absolutely unacceptable for the fabrication of sensors for medical thermometry.

Figure 11:
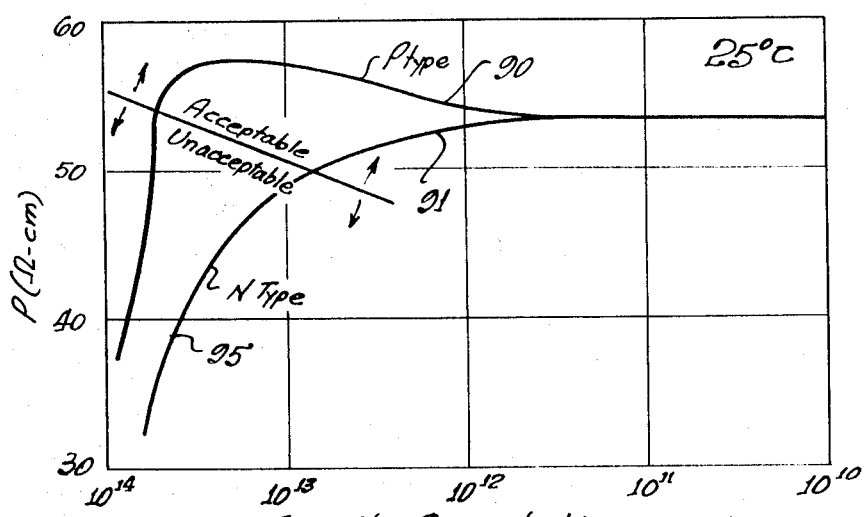
FIG. 11 is a graph showing resistivity in ohm-centimeters as a function of impurity concentration for N- and P-type crystalline germanium.

Having thus defined the purity limits for acceptable germanium and noted that all germanium purer than those limits can be fabricated into medically accurate temperature sensors, we refer to FIG. 11 which presents the resistivity as a function of impurity concentration for both P-type (90) and N-type (91) germanium at 25° C. The line with a pair of arrows pointing upward and intersecting curves 90 and 91 indicates that crystalline germanium whose net impurity concentration is less than the value therein indicated is acceptable for the fabrication of medically accurate body temperature sensors. The point 95 indicates material of the purity for which curve 96 of FIG. 10 is drawn.

Thus, the graphs in FIGS. 10 and 11 demonstrate that the acceptable material which may be used in the present invention device must for N-type conductivity have 8×10¹² net donors/cm.³ or less and for P-type conductivity have 5×10¹³ net acceptors/cm.³ or less. This is to be contrasted with the single crystal germanium element taught by Vanik, et al. wherein it specifies that the resistivity which is acceptable is from 1 to 70 ohms centimeter at 25° C. One ohm centimeter at 25° C. is equivalent to approximately 10¹⁶ net acceptors or donors. Seventy ohms centimeter material at 25° C. is physically impossible. Clearly, the teaching of Vanik, et al. extends beyond both ends of the discovered critical range of resistivity found in the present invention to be required for a medically accurate body-temperature-sensing thermometer.

The maximum in the P-type conductivity curve of FIG. 11 results from the fact that holes are less mobile than donors. Since in high-purity germanium, both acceptors and donors contribute to current flow, there is a peak in the curve of resistivity versus purity as low-mobility acceptors replace high-mobility donors as the predominant carrier of electric current.

The contrast between the resistance and response of a medical thermometer fabricated in accordance with the present invention and that of a typical industrial thermometer utilizing platinum wire as a sensory element is illustrated by the curves of FIG. 9. Curve 100 illustrates the relatively large dynamic response of a germanium sensor through the temperature range of 90° F. to 110° F. relative to the slight variations of platinum, as indicated by curve 101 over the same region. In particular, the resistance of germanium varies from approximately 5,800 ohms to a resistance of about 3,800 ohms over said temperature range while the resistance of a platinum sensor changes from between 113 ohms to 117 ohms over said temperature range. Hence, there is in excess of a 50-percent change in the resistance of germanium slab over the temperature range, while the resistance of a platinum wire changes only 3 percent over said range. The large resistance change of a high-purity germanium bar having ambipolar contacts thereto, in addition to enabling relatively insensitive measuring equipment to be utilized with the present invention, has the decided advantage of enabling the germanium slab to be manufactured to relatively loose tolerances while still maintaining necessary medical accuracy.

To obtain sensor-to-sensor reproducible accuracy, as required for medical thermometry, a suitable temperature measurement concept must be derived from an absolute physical basis. The resistivity as of function of temperature of high-purity germanium is such a basis. However, one cannot easily measure resistivity directly, but rather measures the resistance of a given size and shape bar of germanium with electrical contacts affixed at or near the opposed ends thereof. In so doing, the contacts may, and usually do, affect the measurement to some extent. It is traditional when working with low-purity material to describe a contact which has minimum influence on the operation of a given device as "ohmic" in the sense that it is not rectifying. However, when working with high-purity germanium, as required for medical thermometry, the concept of an "ohmic" contact has no meaning since, in fact, "ohmic" contacts (as described, for example, by Vanik, et al.) will in many cases seriously affect the measured resistance relative to that which would be measured in the absence of such contacts. Below is described the ambipolar contact. The perturbing influence of this contact is limited to a spatial region which is short compared with the total length of the sensor bar. Therefore, by choosing an appropriate sensor geometry the effect of contact perturbations can be minimized to the extent that measured sensor resistance is, to clinical accuracy, only a property of the high-purity germanium of which the sensor is fabricated.

Reference is now made to FIGS. 15 to 20 in order to explain the nature of the ambipolar contact which the inventors have discovered is required in order to produce the desired medically accurate thermometer of the present invention employing a bar of high-purity crystalline germanium as the temperature-sensing element.

FIG. 15 is a schematic cross section of a high-purity germanium bar of length L' having contacts alloyed into the ends thereof. Alloying forms an N⁺ region to a depth $d_a$ at each end of the bar (a P⁺ contact could equally well be used; N⁺ has been chosen for illustrative purposes only).

FIG. 16 is a semiquantitative (i.e., not drawn to exact scale) energy band diagram of the structure of FIG. 15. The N+ regions, extending a distance $d_A$ from each end of the bar, correspond to regions where the conduction band (C.B.) lies below the Fermi level $E_F$. In addition to this distance $d_A$, an additional distance $d'$ is required before the electronic potential within the semiconductor is restored to its value in the absence of contacts (i.e., the bulk value).

FIG. 17 is a semiquantitative graph of carrier density as a function of position along the bar of FIG. 15. Curves for both acceptors and donors are shown. In the bulk of an unperturbed bar of high-purity germanium, $n \approx p \equiv n_i \approx 10^{13}/cm.^3$. Alloy "ohmic" contacts at the two ends of the bar 140 enforce the boundary condition $n(o)$ $n_s' \approx 10^{20}/cm.^3$. Hence $p(o) \approx 10^6/cm.^2$ by use of the relation $n(x)p(x)=n_i^2$. The characteristic distance over which the carrier concentration relaxes from its imposed value $n_s'$ at the surface to its bulk value $n_i$ is the Debye length $d_D$. We may write $n_{ex}(x)n_s{}'e^{1x/d}D$ where $n_{ex}$ is the excess donors concentration $n_s'-n_i$ near the contact. For medical accuracy, the resistance of high-purity germanium must be measured to a fractional accuracy of 0.4 percent, as previously discussed. Therefore, the distance $d'$ may be defined as the distance at which $n_{ex}/n_i=0.004$. Thus, $$0.004=(n_s'/n_i)e^{1d'/d}D$$

Solving this equation yields $d' \approx 22 d'_D$. For high-purity germanium $d_D \approx 10^{14}$ cm. Thus, $d' \approx 2 \times 10^{13}$ cm. If the device of FIG. 15 is to be a reproducible, medically accurate temperature sensor bar, the fractional resistance accuracy constrain now requires, considering contacts at both ends, that $L'_o \geq 500(d_A+d')$. Neglecting $d_A$ for the moment, we find that $L'_o$ must be longer than 1 cm. if medical accuracy is to be obtained. Of course, $d_A$ cannot in fact be neglected. The alloying process is notably hard to control and hence $L'_o$ will have to be significantly increased to manufacture reproducible medically accurate thermometers. However, lengths in excess of fractional centimeters are impractical for disposable medical thermometry sensor bars. If, as illustrated in FIGS. 15, 16 and 17 $L'$ is less than several centimeters, then the resistance measured between conductors 141 and 142 is dependent on the detailed nature of the contacts. Therefore, the conventional alloyed "ohmic" contact is not suitable for the manufacture of disposable medical sensors fabricated of high-purity germanium.

FIG. 18 is a schematic cross section of a high-purity bar of length $L$ having ambipolar contacts located at the ends thereof. Those contacts consist of a metal, such as indium, in intimate contact with the germanium surface, but not alloyed thereto.

FIG. 19 is a semiquantitative energy band diagram of the structure of FIG. 18. The ambipolar contact is shown with the metal Fermi level located just below the middle of the forbidden gap in the germanium. Ambipolar contacts to high-purity germanium may be fabricated using metals which form an energy barrier such that at $25°C$., $0.05ev. \leq \phi \leq 0.70ev$. For the numerical example below $\Phi \approx 0.55 eV$.

FIG. 20 is a semiquantitative graph of carrier density as a function of position along the bar 143 of FIG. 18. Curves for both acceptors and donors are shown. Since in the case $p_s > n_s'$, we will employ the same analysis as previously except substitute $p_s$ for $n_s'$. Now $p_s \leq 10^{16}$, since $\Phi \approx 0.55 eV$, hence $$0.004=(p_s/n_i)e^{1d/d}D$$

which yields $d \approx 12 d_D$. Therefore, $L_o \approx 0.5$ cm.

Thus, the resistance $R_{144+145}$ (between conductors 144 and 145 of the bar 143 of FIG. 18) is essentially (to medical accuracy) that of the bulk germanium if $L>0.5$ cm. Ambipolar contacts allow a resistance measurement performed on a bar of high-purity germanium to respond, to medical accuracy, only to the bulk properties of the germanium thus assuring reproducibly accurate thermometry. Note that the more nearly $\Phi$ approached $E_{g/2}$, where $E_g$ is the band gap of high-purity germanium, the shorter sensor bar 143 may be and still maintain the ambipolar condition.

Reference is now made to FIG. 13 wherein there is shown a typical circuit for measuring the resistance of a germanium sensor element. Therein the sensor element 30 is illustrated as being connected in series with a resistor 105 and low voltage DC source 106, such as is derived from a battery. The voltage across resistor 105, indicative of the resistance of germanium element 30, and hence of the temperature thereof, is monitored by a DC voltmeter 107, preferably of the digital readout type. To provide a linear correlation between the readout of voltmeter 107 and the temperature of germanium element 30, a circuit for linearizing the exponential temperature versus resistance variation of element 30 is provided. While linearization can be incorporated into a specifically designed digital voltmeter, it may be preferred to utilize existing voltmeters having a linear display of indicated voltage versus voltage input. To enable such voltmeters to be utilized, the resistance versus temperature response to element 30 can be linearized by providing resistance 105 with a nonlinear current versus voltage characteristic to compensate for the exponential resistance versus temperature characteristics of the germanium sensor element 30. In this case, the voltage versus current characteristic of nonlinear resistance 105 is selected so that the voltage across the resistor has a straight line variation indicative of the temperature of element 30 over the temperature range on interest (usually 96°–106° F.).

The need for a nonlinear resistance element for resistor 105 can be obviated if the value of the resistance is judiciously selected. It can be shown that the response of germanium bar 30 over the temperature range between 96° F–106° F. can be approximated as a straight line function if the value of resistor 105, $R_1$, is selected in accordance with:

$$R_1=\frac{B^2+2AC}{C} \quad (1)$$

where:

$$B=-A\exp\left(\frac{E_g}{2kT_0}\right),$$

$$C=A\left[\frac{1}{2}\left(\frac{E_g}{2kT_0{}^2}\right)^2+\frac{E_g}{kT_0{}^3}\right],$$

$A=$ the resistance of bar 30 at $T_0$,
$exp$ is the exponential operator indicating that $e$, the base of natural logarithms, is raised to the power in parenthesis,
$E_g=$ the semiconductor band gap,
$k=$ Boltzman's constant, and
$T_0=$ a temperature in the vicinity of body temperature (measured in degrees Kelvin).

Equation (1) can be approximated by substitution for the values of $A$, $B$ and $C$ as $$R_1=\frac{2\left(\frac{E_g}{2kT_0{}^2}\right)^2+\frac{1}{T_0}\left(\frac{E_g}{2kT_0{}^2}\right)}{\frac{1}{2}\left(\frac{E_g}{2kT_0{}^2}\right)^2+\frac{1}{T_0}\left(\frac{E_g}{2kT_0{}^2}\right)} \cdot A \doteq 4A=4R_0(T_0) \quad (2)$$

If the value of resistance 105 is selected in accordance with equation (2), there is, within medical accuracy, a linear relation between the temperature of germanium sensor element 30 and the voltage across resistance 105 over the temperature range of at least 96°–106° F.

Reference is now made to FIG. 14 wherein there is shown a modified circuit arrangement, similar to that of FIG. 13. To enable source 106 to be a desired low voltage it may be necessary to provide a gain scaling resistor 130 or an offset voltage such that the voltage between the junction of resistor 105 and sensor element 30 and some reference point (such as the junction between resistors 128 and 129 in FIG. 14) is numerically equal (in appropriate units, e.g., millivolts) to the temperature of the sensor (in appropriate units, e.g., degrees Fahrenheit). An offset voltage may be provided with a bridge network as in FIG. 18 wherein a branch including fixed resistors 128 and 129 is connected in parallel with the branch including germanium bar 30 and resistors 105 and 130. In the circuit of FIG. 18, digital voltmeter 107 is connected between the intermediate taps of the two branches to measure the variable voltage across resistance 105 relative to the fixed voltage across resistor 129. The fixed voltage across resistor 129 is selected, for example, such that 1 volt between the two inputs to voltmeter 107 is reflected as a temperature 100.0° F. As the temperature sensed by the germanium element 30 increases, whereby the germanium element resistance decreases to increase the voltage across resistor 105, the voltage between the element and resistor 105 increases linearly relative to the voltage between resistors 128 and 129. The increase is such that a one-tenth of 1° F. change in sensed temperature is reflected as a 0.001-volt increase at the input terminal of voltmeter 107 connected to sensor element 30 and resistance 105. Voltmeter 107 may be provided with outputs suitable for direct interfacing with electronic patient-monitoring equipment.

In addition, specifically designed resistance-measuring readouts, calibrated to display a given resistance as a given temperature, are directly applicable to the temperature readout function. Such readouts are used in conjunction with the disposable sensor assemblies, and perform the function of voltmeter 107 and associated circuitry in FIGS. 13 and 14. These readouts may also be provided with outputs suitable for direct interfacing with electronic patient-monitoring equipment.

Because of the extremely small size and mass of the plastic material at the tip of the sensor 31 and the large thermal impedance along sensor 31, the thermal time constant of the medical thermometer of the present invention is relatively short, on the order of 2 seconds. Because of this short thermal time constant the present invention thermometer is most unlikely to be misused. That is, prolonged intimate thermal contact with the tissues of the patient is not required; only a short period of contact, on the order of 15 seconds, is required for the sensor to equilibrate and thus reach the body temperature to be measured. Further, the digital readout device 61 has a plurality of numeric display tubes 69 whose values continue to visually change during the measurement period. The nurse or doctor taking the reading of body temperature, therefore, has a clear indication so long as the values of the tubes 69 are changing that equilibrium has not yet been reached and that, therefore, the reading should not yet be recorded. Thus, not only is the change of an erroneous reading reduced because the temperature appears in digital form requiring no "interpretation" by the reader of a mercury column in a crowded scale glass tube, but also there is reduced the risk of the reading being taken before the equilibrium temperature of the body being measured has been reached.

There has thus been described a new and improved disposable thermometer and associated readout device which may be advantageously used in connection therewith.

We claim:

1. In a disposable human body temperature-measuring thermometer;
a bar of crystalline germanium having a pair of spaced, ambipolar contacts, said bar of germanium being of a material selected from the group consisting of germanium of N-type conductivity in which the net donor concentration is $8 \times 10^{12}/cm.^3$ or less and germanium of P-type conductivity in which the net acceptor concentration is $5 \times 10^{13}/cm.^3$ or less.

2. A disposable human body temperature-measuring thermometer adapted to be connected to an electronic readout device including resistance-measuring means for measuring the resistance between the contacts of a body temperature sensor element comprising:
   a. a bar of crystalline germanium having a pair of spaced, ambipolar contacts, said bar of germanium being of a material selected from the group consisting of germanium of N-type conductivity in which the net donor concentration is $8 \times 10^{12}/cm.^3$ or less and germanium of P-type conductivity in which the net acceptor concentration is $5 \times 10^{13}/cm.^3$ or less;
   b. a nonconducting elongate rod suitable for use in body cavities, said rod defining a bar-receiving opening therein to receive said bar of germanium;
   c. said bar of germanium being disposed within said opening in said rod; and
   d. means for coupling said contacts to said resistance-measuring means.

3. A thermometer as defined in claim 2, wherein said opening in said elongate rod is located near one end thereof and wherein said rod carries a pair of separated electrical conductors connected one to each of said contacts on said bar, said conductors terminating near the opposite end of said rod and being adapted to be connected to an electronic circuit means for generating a signal representative of the temperature of said bar.

4. The thermometer of claim 2, wherein said resistance-measuring means includes means for displaying the temperature of said semiconductor body digitally in appropriate temperature units.

5. In the thermometer defined in claim 2, wherein said rod includes a pair of spaced metallic conductors disposed upon the surface thereof to serve as said means for coupling said contacts to said resistance-measuring means.

6. In the thermometer defined in claim 5, wherein contact is made between said conductors and said bar of germanium by the use of solder disposed near opposed ends of said bar.

7. In the thermometer defined in claim 6, wherein said solder includes indium as a major constituent.